United States Patent
Yue et al.

(10) Patent No.: US 7,127,358 B2
(45) Date of Patent: Oct. 24, 2006

(54) METHOD AND SYSTEM FOR RUN-TO-RUN CONTROL

(75) Inventors: Hongyu Yue, Austin, TX (US); Joseph William Wiseman, Austin, TX (US)

(73) Assignees: Tokyo Electron Limited, Tokyo (JP); Advanced Micro Devices, Inc., Sunnyvale, CA (US)

( * ) Notice: Subject to any disclaimer, the term of this patent is extended or adjusted under 35 U.S.C. 154(b) by 2 days.

(21) Appl. No.: 10/811,932

(22) Filed: Mar. 30, 2004

(65) Prior Publication Data

US 2005/0222781 A1 Oct. 6, 2005

(51) Int. Cl.
*G06F 15/00* (2006.01)

(52) U.S. Cl. .................... 702/30; 702/127; 702/182; 702/189; 438/5; 438/10; 438/17; 219/490; 700/19; 700/28; 700/32

(58) Field of Classification Search ............... 702/109, 702/127, 182, 189, 190, 193–194; 438/5, 438/10, 17; 219/490; 700/19, 28, 32
See application file for complete search history.

(56) References Cited

U.S. PATENT DOCUMENTS

| | | | |
|---|---|---|---|
| 5,940,299 A * | 8/1999 | Choi et al. ................ | 700/121 |
| 6,249,712 B1 * | 6/2001 | Boiquaye ................... | 700/31 |
| 6,587,744 B1 * | 7/2003 | Stoddard et al. ........... | 700/121 |
| 6,853,920 B1 * | 2/2005 | Hsiung et al. ............. | 702/1 |
| 2004/0267399 A1 * | 12/2004 | Funk ......................... | 700/121 |
| 2005/0071039 A1 * | 3/2005 | Mitrovic .................... | 700/121 |
| 2005/0221514 A1 * | 10/2005 | Pasadyn et al. ........... | 438/14 |

OTHER PUBLICATIONS

Mozumder et al., 'A Monitor Wafer Based Controller for Semiconductor Processes', Aug. 1994, IEEE Publication, vol. 7, No. 3, pp. 400-411.*
Patel et al., 'Adaptive Optimization of Run-to-Run controllers: The EWMA Example', Feb. 2000, IEEE Publication, vol. 13, No. 1, pp. 97-107.*
Del Castillo et al., 'An Adaptive Run-to-Run Optimizing Controller for Linear and Nonlinear Semiconductor Processes', May 1998, IEEE Publication, vol. 11, No. 2, pp. 285-295.*
Paramore, 'simple Curve Fitting', May 3, 2002, pp. 1-4.*
Nital S. Patel, et al., "Adaptive Optimization of Run-to-Run Controllers: The EWMA Example", IEEE Transactions on Semiconductor Engineering, vol. 13, No. 1, Feb. 2000, pp. 97-107.
P. K. Mozumder, et al., "A Monitor Wafer Based Controller for Semiconductor Processes", IEEE Transactions on Semiconductor Manufacturing, vol. 7, No. 3, Aug. 1994, pp. 400-411.

* cited by examiner

Primary Examiner—Carol S. W. Tsai
Assistant Examiner—Elias Desta
(74) Attorney, Agent, or Firm—Oblon, Spivak, McClelland, Maier & Neustadt, P.C.

(57) ABSTRACT

A method and system of controlling a process from run-to-run for semiconductor manufacturing. The method of control utilizes a process model to establish a relationship between process control input data and process control output data. The method of control involves minimizing the difference between target process control output data and process control output data predicted by applying the process model to the new process control input data.

51 Claims, 11 Drawing Sheets

METHOD AND SYSTEM FOR RUN-TO-RUN CONTROL

CROSS-REFERENCE TO RELATED APPLICATIONS

FIELD OF THE INVENTION

The present invention relates to a method and system for monitoring, adjusting, and controlling a process control output data in integrated circuit (IC) manufacturing, and, more particularly, to a method and system for utilizing multivariate analysis to monitor, adjust, and control process control output data in a semiconductor manufacturing process.

BACKGROUND OF THE INVENTION

Throughout the various stages of plasma processing, such as semiconductor or display manufacturing, etc., critical process parameters may vary significantly. Processing conditions change over time with the slightest changes in critical process parameters creating undesirable results. Small changes can easily occur in the composition or pressure of an etch gas, process chamber, or substrate temperature. As such, plasma processing facilities require constant monitoring. Even under conditions expected to yield nominally the same results, the development of the depositions for example of insulating (or conducting) layers on the fixtures of the plasma processing facility alter the electrical impedance of the processing facility and, hence, alter the existing electrical configuration by which power is coupled into the plasma facility. As such, the plasma densities and plasma uniformities change with time (i.e., age) despite the consistency of input parameters.

During the manufacture of semiconductor ICs, monitoring and controlling process parameters are critical for acquiring the highest IC product yield and quality. For example, the precise control of etch feature critical dimensions is critical in the damascene structure process that is utilized for forming IC wiring levels and interconnect structures through inter- and intra-level dielectric layers, as well as gate contacts. Yet, the required process control is hampered by the above noted changes occurring within the plasma processing facility.

Conventionally, after-the-effect observations of the resultant etch process or resultant etch structure are used as a best guest basis to alter the process control model in an attempt to "correct" the process. Such after-the-effect approaches to process control waste product as the process model is corrected. Further, such after-the-effect changes are not designed to predict changes to the process model.

SUMMARY OF THE INVENTION

A method and system for monitoring, adjusting, and controlling process control output data in integrated circuit (IC) manufacturing is described that alters the process model to control the process model on a predictive model response to target changes.

These and other objects of the present invention are provided by a method and system and computer readable medium for controlling a process in a semiconductor manufacturing system, as well as a graphical user interface for predicting and optimizing process control input and output data. The method of controlling a process in the semiconductor manufacturing system involves: setting process control input data for the process in the semiconductor manufacturing system; measuring process control output data from the process in the semiconductor manufacturing system; determining a relationship between the process control output data and the process control input data to a target result of the process; setting target process control output data; and calculating new process control input data by minimizing a difference between the target process control output data and predicted process control output data, wherein the predicted process control output data is determined using the relationship with the new process control input data.

A control system in one embodiment of the present invention for controlling a process in a semiconductor manufacturing system involves: a process tool controller configured to be coupled to a process tool for executing the process, wherein the process tool controller includes a process recipe controller configured to set and adjust process control input data for the process, and to set target process control output data to a target result of the process, and a process model coupled to the process recipe controller and configured to provide a relationship between the process control input data and the process control output data. The process recipe controller generates new process control input data by minimizing a difference between the target process control output data and process control output data predicted by the relationship using the new process control input data.

A semiconductor manufacturing system in one embodiment of the present invention for performing a process involves: a process tool for executing the process; and a process tool controller coupled to the process tool, wherein the process tool controller includes a process recipe controller configured to set and adjust process control input data for the process, and set target process control output data to a target result of the process, and a process model coupled to the process recipe controller and configured to provide a relationship between the process control input data and the process control output data, wherein the process recipe controller generates new process control input data by minimizing a difference between the target process control output data and process control output data predicted by the relationship using the new process control input data.

A graphical user interface (GUI) in one embodiment of the present invention for utilizing a process model to predict process control output data from process control input data involves: means for entering an input change to at least one parameter in the process control input data using at least one delta field in the GUI; means for executing the process model to determine an output change in at least one parameter of the process control output data using the input change; and means for displaying the output change in an output field in the GUI.

A graphical user interface (GUI) in one embodiment of the present invention for optimizing process control input data to achieve target process control output data using a process model involves: means for entering a target change to at least one parameter in the process control output data; means for executing the process model to optimize an input change to at least one parameter in the process control input data by using the target change; and means for displaying the input change in a delta field in the GUI.

BRIEF DESCRIPTION OF THE DRAWINGS

A more complete appreciation of the present invention and many attendant advantages thereof will be readily obtained as the same becomes better understood by reference to the following detailed description when considered in connection with the accompanying drawings, wherein.

DETAILED DESCRIPTION OF THE PREFERRED EMBODIMENTS

Figure 1:
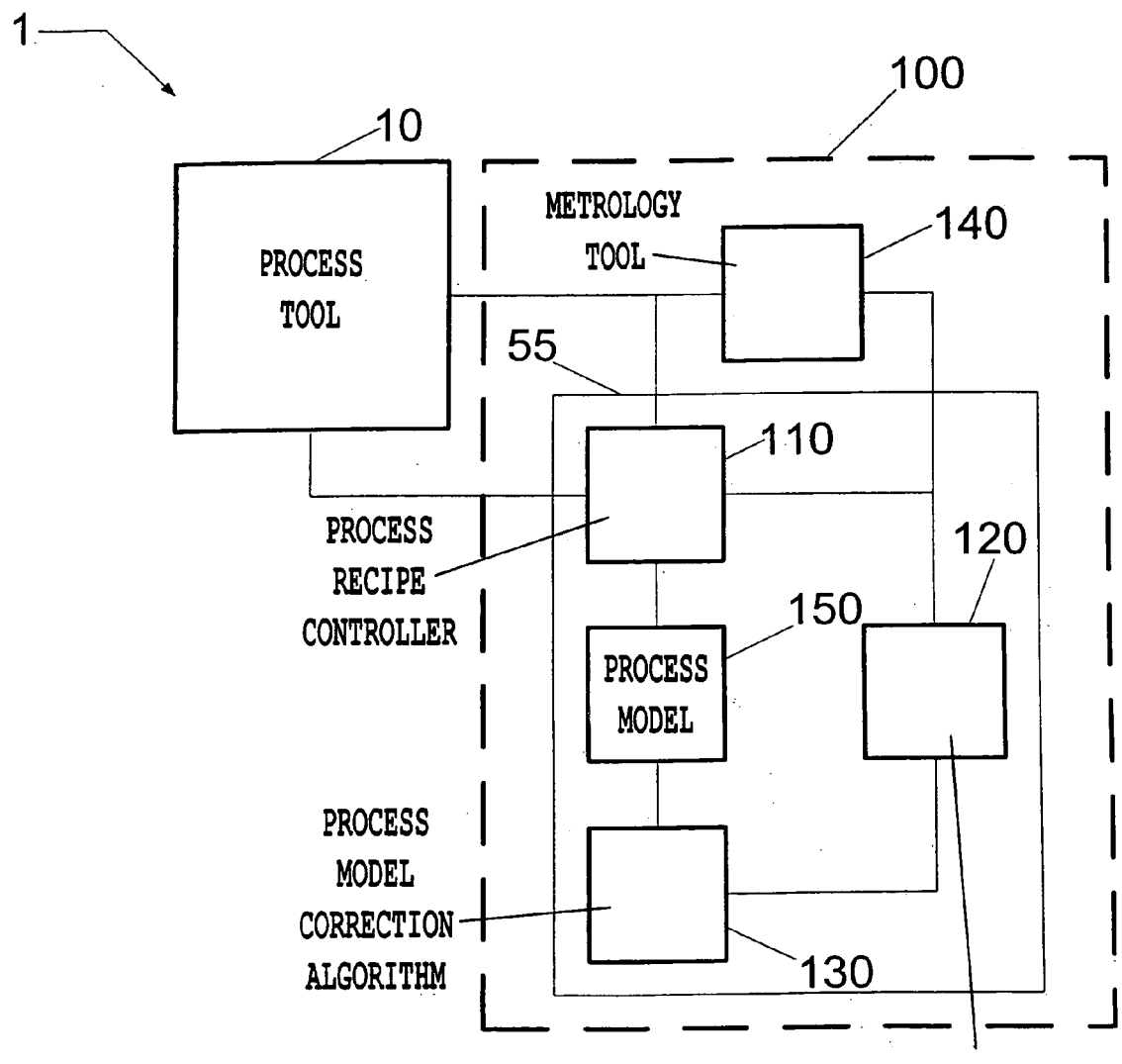
FIG. 1 shows a semiconductor manufacturing system according to a preferred embodiment of the present invention.

Referring now to the drawings, wherein like reference numerals designate identical, or corresponding parts throughout the several views, and more particularly to FIG. 1 thereof.

According to one embodiment of the present invention, a semiconductor manufacturing system 1 is depicted in FIG. 1 including a process tool 10 and a process control system 100. The process control system 100 includes a process tool controller 55 coupled to the process tool 10, where the process tool controller 55 includes a process recipe controller 110, a process model 150, a process model correction filter 120, and a process model correction algorithm 130. The process model 150 is configured to predict process control output data from process control input data. In addition, the process control system 100 can further include a metrology tool 140 coupled to the process tool 10 and the process recipe 110. Metrology tool 140 can be coupled to the process tool 10 and to the process tool controller 55, and metrology tool 140 can be configured to receive substrates processed within the process tool 10 and to measure process control output data.

The process recipe controller 110 is configured to receive process control output data from metrology tool 140, predicted process control output data from the process model 150, and target process control output data. Using this data, the process recipe controller 110 is configured to adjust the process control input data in order to achieve the target process control output data.

Furthermore, the process model correction algorithm 130 is configured to receive process control output data from metrology tool 140 as well as a weighting factor set in the process model correction filter 120. Given the current process control input data, the process model correction algorithm 130 can determine a correction to the process model. The process model 150 is thereafter updated using the correction set forth in the process model correction algorithm 130.

In the illustrated embodiment depicted in FIG. 1, the semiconductor manufacturing system 1 utilizes a plasma for material processing. Desirably, the semiconductor manufacturing system 1 includes an etch chamber. Alternately, the semiconductor manufacturing system 1 includes a photoresist coating chamber such as, for example, a photoresist spin coating system; a photoresist patterning chamber such as, for example, an ultraviolet (UV) lithography system; a dielectric coating chamber such as, for example, a spin-on-glass (SOG) or spin-on-dielectric (SOD) system; a deposition chamber such as, for example, a chemical vapor deposition (CVD) system or a physical vapor deposition (PVD) system; a rapid thermal processing (RTP) chamber such as, for example, a RTP system for thermal annealing; or a batch-processing vertical furnace.

Figure 2:
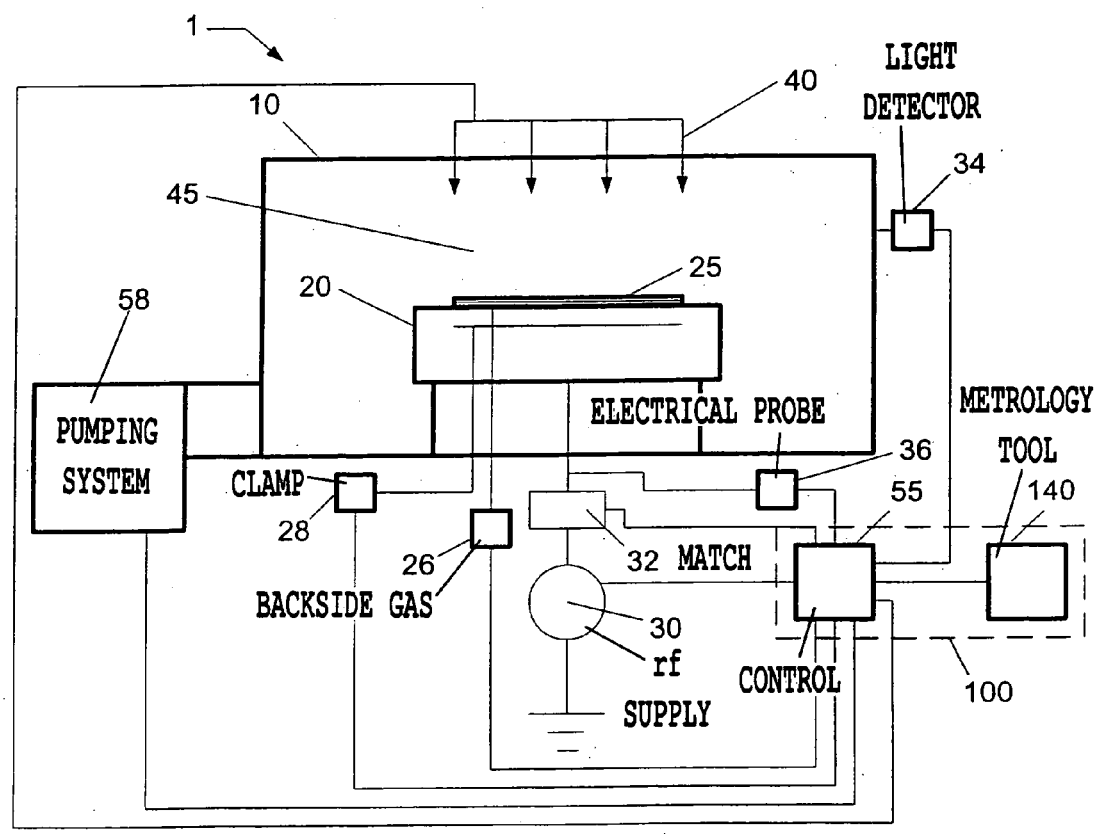
FIG. 2 shows a semiconductor manufacturing system according to one embodiment of the present invention.

According to the illustrated embodiment of the present invention depicted in FIG. 2, the semiconductor manufacturing system 1 includes process tool 10, substrate holder 20, upon which a substrate 25 to be processed is affixed, gas injection system 40, and vacuum pumping system 58. Substrate 25 can be, for example, a semiconductor substrate, a wafer, or a liquid crystal display (LCD). Process tool 10 can be, for example, configured to facilitate the generation of plasma in processing region 45 adjacent a surface of substrate 25, where plasma is formed via collisions between heated electrons and an ionizable gas. An ionizable gas or mixture of gases is introduced via gas injection system 40, and the process pressure is adjusted. Desirably, plasma is utilized to create materials specific to a predetermined materials process, and to aid either the deposition of material to substrate 25 or the removal of material from the exposed surfaces of substrate 25. For example, controller 55 can be used to control vacuum pumping system 58 and gas injection system 40.

Substrate 25 can be, for example, transferred into and out of process tool 10 through a slot valve (not shown) and chamber feed-through (not shown) via robotic substrate transfer system where it is received by substrate lift pins (not shown) housed within substrate holder 20 and mechanically translated by devices housed therein. Once substrate 25 is received from substrate transfer system, it is lowered to an upper surface of substrate holder 20.

For example, substrate 25 can be affixed to the substrate holder 20 via an electrostatic clamping system 28. Furthermore, substrate holder 20 can further include a cooling system including a re-circulating coolant flow that receives heat from substrate holder 20 and transfers heat to a heat exchanger system (not shown), or when heating, transfers heat from the heat exchanger system. Moreover, gas can be delivered to the back-side of the substrate via a backside gas system 26 to improve the gas-gap thermal conductance between substrate 25 and substrate holder 20. Such a system can be utilized when temperature control of the substrate is required at elevated or reduced temperatures. For example, temperature control of the substrate can be useful at temperatures in excess of the steady-state temperature achieved due to a balance of the heat flux delivered to the substrate 25 from the plasma and the heat flux removed from substrate 25 by conduction to the substrate holder 20. In other embodiments, heating elements, such as resistive heating elements, or thermoelectric heaters/coolers can be included.

As shown in FIG. 2, substrate holder 20 includes an electrode through which RF power is coupled to plasma in processing region 45. For example, substrate holder 20 can be electrically biased at an RF voltage via the transmission of RF power from RF generator 30 through impedance match network 32 to substrate holder 20. The RF bias can serve to heat electrons to form and maintain plasma. In this configuration, the system can operate as a reactive ion etch (RIE) reactor, where the chamber and upper gas injection electrode serve as ground surfaces. A typical frequency for the RF bias can range from 1 MHz to 100 MHz and is preferably 13.56 MHz.

Alternately, RF power can be applied to the substrate holder electrode at multiple frequencies. Furthermore, impedance match network 32 serves to maximize the transfer of RF power to plasma in processing chamber 10 by minimizing the reflected power. Various match network topologies (e.g., L-type, π-type, T-type, etc.) and automatic control methods can be utilized.

With continuing reference to FIG. 2, process gas can be, for example, introduced to processing region 45 through gas injection system 40. Process gas can, for example, include a mixture of gases such as argon, $CF_4$ and $O_2$, or argon, $C_4F_8$ and $O_2$ for oxide etch applications, or other chemistries such as, for example, $O_2/CO/Ar/C_4F_8$, $O_2/CO/Ar/C_5F_8$, $O_2/CO/Ar/C_4F_6$, $O_2/Ar/C_4F_6$, $N_2/H_2$. Gas injection system 40 includes a showerhead, where process gas is supplied from a gas delivery system (not shown) to the processing region 45 through a gas injection plenum (not shown), a series of baffle plates (not shown) and a multi-orifice showerhead gas injection plate (not shown).

Vacuum pump system 58 can, for example, include a turbo-molecular vacuum pump (TMP) capable of a pumping speed up to 5000 liters per second (and greater) and a gate valve for throttling the chamber pressure. In conventional plasma processing devices utilized for dry plasma etch, a 1000 to 3000 liter per second TMP is generally employed. TMPs are useful for low pressure processing, typically less than 50 mTorr. At higher pressures, the TMP pumping speed falls off dramatically. For high pressure processing (i.e., greater than 100 mTorr), a mechanical booster pump and dry roughing pump can be used. Furthermore, a device for monitoring chamber pressure (not shown) is coupled to the process chamber 16. The pressure measuring device can be, for example, a Type 628B Baratron absolute capacitance manometer commercially available from MKS Instruments, Inc. (Andover, Mass.).

Additionally, process control system 100 can include a plurality of sensors coupled to process tool 10 to measure tool data and process tool controller 55 can be coupled to the sensors to receive tool data. The sensors can include both sensors that are intrinsic to the process tool 10 and sensors extrinsic to the process tool 10. Sensors intrinsic to process tool 10 can include those sensors pertaining to the functionality of process tool 10 such as the measurement of the Helium backside gas pressure, Helium backside flow, electrostatic clamping (ESC) voltage, ESC current, substrate holder 20 temperature (or lower electrode (LEL) temperature), coolant temperature, upper electrode (UEL) temperature, forward RF power, reflected RF power, RF self-induced DC bias, RF peak-to-peak voltage, chamber wall temperature, process gas flow rates, process gas partial pressures, chamber pressure, capacitor settings (i.e., $C_1$ and $C_2$ positions), a focus ring thickness, RF hours, focus ring RF hours, and any statistic thereof. Alternatively, sensors extrinsic to process tool 10 can include those not directly related to the functionality of process tool 10 such as a light detection device 34 for monitoring the light emitted from the plasma in processing region 45 as shown in FIG. 2, or an electrical measurement device 36 for monitoring the electrical system of process tool 10 as shown in FIG. 2.

The light detection device 34 can include a detector such as a (silicon) photodiode or a photomultiplier tube (PMT) for measuring the total light intensity emitted from the plasma. The light detection device 34 can further include an optical filter such as a narrow-band interference filter. In an alternate embodiment, the light detection device 34 includes a line CCD (charge coupled device) or CID (charge injection device) array and a light dispersing device such as a grating or a prism. Additionally, light detection device 34 can include a monochromator (e.g., grating/detector system) for measuring light at a given wavelength, or a spectrometer (e.g., with a rotating grating) for measuring the light spectrum such as, for example, the device described in U.S. Pat. No. 5,888,337.

The light detection device 34 can include a high resolution OES sensor from Peak Sensor Systems. Such an OES sensor has a broad spectrum that spans the ultraviolet (UV), visible (VIS) and near infrared (NIR) light spectrums. The resolution is approximately 1.4 Angstroms, that is, the sensor is capable of collecting 5550 wavelengths from 240 to 1000 nm. The sensor is equipped with high sensitivity miniature fiber optic UV-VIS-NIR spectrometers which are, in turn, integrated with 2048 pixel linear CCD arrays.

The spectrometers receive light transmitted through single and bundled optical fibers, where the light output from the optical fibers is dispersed across the line CCD array using a fixed grating. Similar to the configuration described above, light emitting through an optical vacuum window is focused onto the input end of the optical fibers via a convex spherical lens. Three spectrometers, each specifically tuned for a given spectral range (UV, VIS and NIR), form a sensor for a process chamber. Each spectrometer includes an independent A/D converter. And lastly, depending upon the sensor utilization, a full emission spectrum can be recorded every 0.1 to 1.0 seconds.

The electrical measurement device 36 can include, for example, a current and/or voltage probe, a power meter, or spectrum analyzer. For example, plasma processing systems often employ RF power to form plasma, in which case, an RF transmission line, such as a coaxial cable or structure, is employed to couple RF energy to the plasma through an electrical coupling element (i.e., inductive coil, electrode, etc.). Electrical measurements using, for example, a current-voltage probe, can be exercised anywhere within the electrical (RF) circuit, such as within an RF transmission line. Furthermore, the measurement of an electrical signal, such as a time trace of voltage or current, permits the transformation of the signal into frequency space using discrete Fourier series representation (assuming a periodic signal). Thereafter, the Fourier spectrum (or for a time varying signal, the frequency spectrum) can be monitored and analyzed to characterize the state of semiconductor manufacturing system 1. A voltage-current probe can be, for example, a device as described in detail in pending U.S. Application Ser. No. 60/259,862 filed on Jan. 8, 2001, and U.S. Pat. No. 5,467,013, each of which is incorporated herein by reference in its entirety.

In alternate embodiments, electrical measurement device 36 can include a broadband RF antenna useful for measuring a radiated RF field external to semiconductor manufacturing system 1. A commercially available broadband RF antenna is a broadband antenna such as Antenna Research Model RAM-220 (0.1 MHz to 300 MHz).

In general, the plurality of sensors can include any number of sensors, intrinsic and extrinsic, which can be coupled to process tool 10 to provide tool data to the process tool controller 55.

Process tool controller 55 includes a microprocessor, memory, and a digital I/O port (potentially including D/A and/or A/D converters) capable of generating control voltages sufficient to communicate and activate inputs to semiconductor manufacturing system 1 as well as monitor outputs from semiconductor manufacturing system 1. As shown in FIG. 2, process tool controller 55 can be coupled to and exchange information with RF generator 30, impedance match network 32, gas injection system 40, vacuum pump system 58, backside gas delivery system 26, electrostatic clamping system 28, light detection device 34, and electrical measurement device 36. A program stored in the memory is utilized to interact with the aforementioned components of a semiconductor manufacturing system 1 according to a stored process recipe. One example of process tool controller 55 is a DELL PRECISION WORKSTATION 530™, available from Dell Corporation, Austin, Tex. Process tool controller 55 can be locally located relative to the semiconductor manufacturing system 1, or it can be remotely located relative to the semiconductor manufacturing system 1. For example, process tool controller 55 can exchange data with semiconductor manufacturing system 1 using at least one of a direct connection, an intranet, and the internet. Process tool controller 55 can be coupled to an intranet at, for example, a customer site (i.e., a device maker, etc.), or it can be coupled to an intranet at, for example, a vendor site (i.e., an equipment manufacturer). Additionally, for example, process tool controller 55 can be coupled to the internet. Furthermore, another computer (i.e., controller, server, etc.) can, for example, access process tool controller 55 to exchange data via at least one of a direct connection, an intranet, and the internet.

Figure 3:
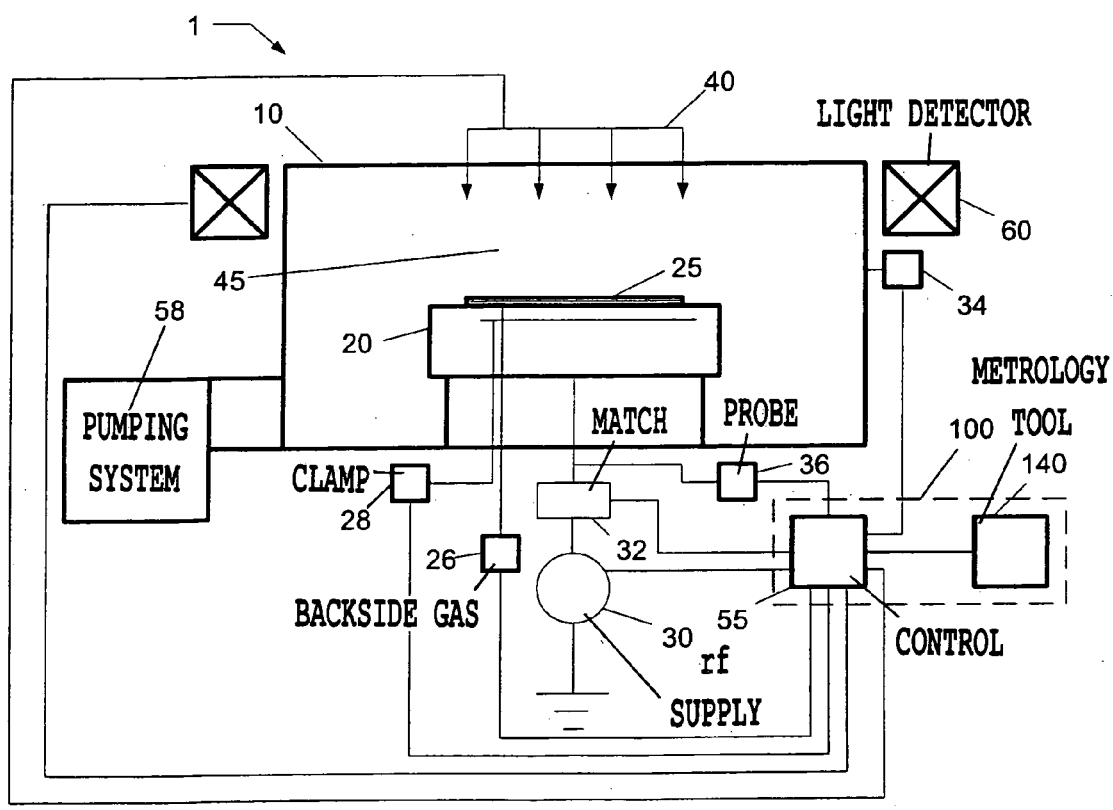
FIG. 3 shows a semiconductor manufacturing system according to another embodiment of the present invention.

As shown in FIG. 3, semiconductor manufacturing system 1 can include a magnetic field system 60. For example, the magnetic field system 60 can include a stationary, or either a mechanically or electrically rotating DC magnetic field in order to potentially increase plasma density and/or improve material processing uniformity. Moreover, controller 55 can be coupled to magnetic field system 60 in order to regulate the field strength or speed of rotation.

Figure 4:
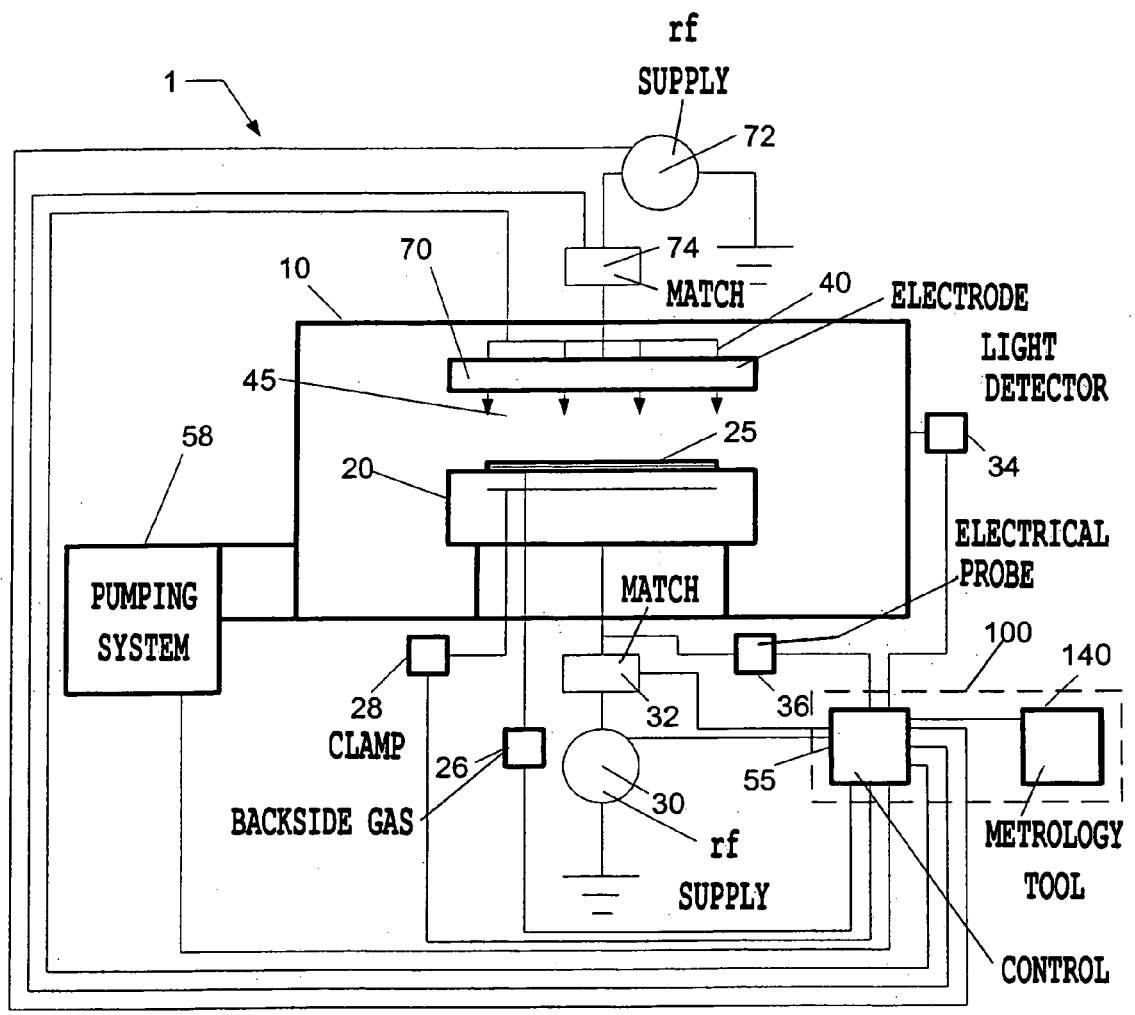
FIG. 4 shows a semiconductor manufacturing system according to a further embodiment of the present invention.

As shown in FIG. 4, the semiconductor manufacturing system 1 can include an upper electrode 70. For example, RF power can be coupled from RF generator 72 through impedance match network 74 to upper electrode 70. A frequency for the application of RF power to the upper electrode preferably ranges from 10 MHz to 200 MHz and is preferably 60 MHz. Additionally, a frequency for the application of power to the lower electrode can range from 0.1 MHz to 30 MHz and is preferably 2 MHz. Moreover, controller 55 can be coupled to RF generator 72 and impedance match network 74 in order to control the application of RF power to upper electrode 70.

Figure 5:
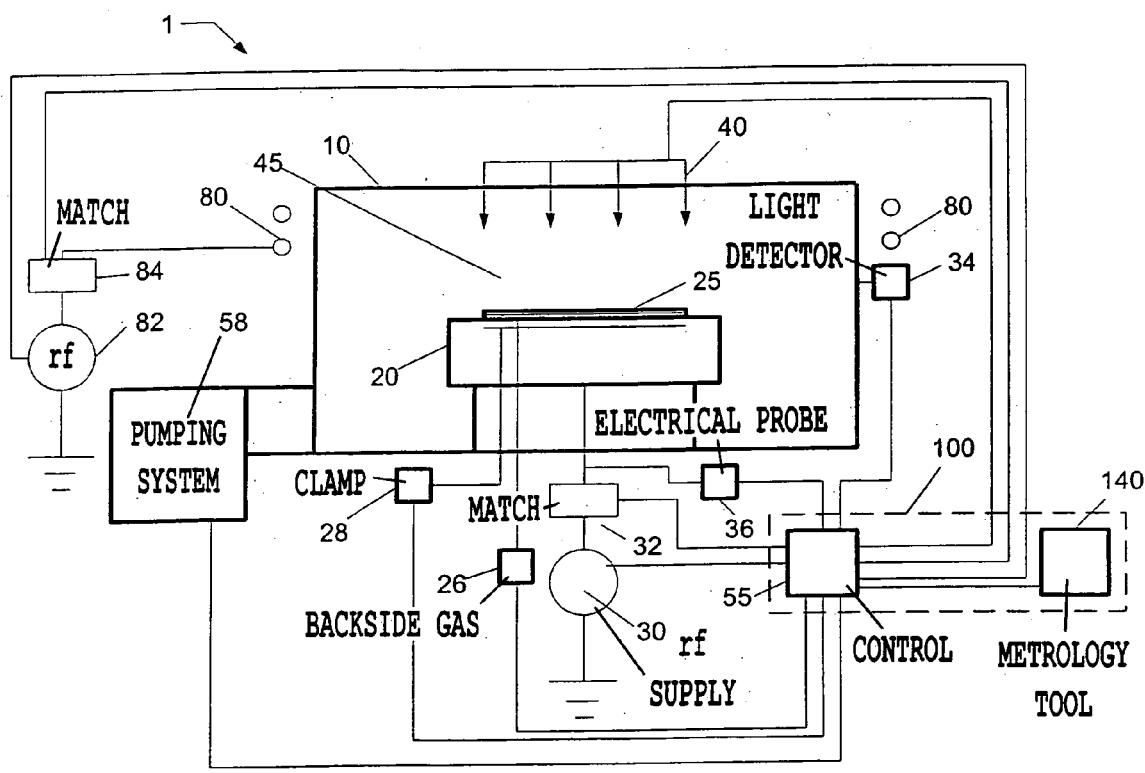
FIG. 5 shows a semiconductor manufacturing system according to an additional embodiment of the present invention.

As shown in FIG. 5, the semiconductor manufacturing system 1 of FIG. 1 can include an inductive coil 80. For example, RF power can be coupled from RF generator 82 through impedance match network 84 to inductive coil 80, and RF power can be inductively coupled from inductive coil 80 through dielectric window (not shown) to plasma processing region 45. A frequency for the application of RF power to the inductive coil 80 preferably ranges from 10 MHz to 100 MHz and is preferably 13.56 MHz. Similarly, a frequency for the application of power to the chuck electrode preferably ranges from 0.1 MHz to 30 MHz and is preferably 13.56 MHz. In addition, a slotted Faraday shield (not shown) can be employed to reduce capacitive coupling between the inductive coil 80 and plasma. Moreover, controller 55 can be coupled to RF generator 82 and impedance match network 84 in order to control the application of power to inductive coil 80. In an alternate embodiment, inductive coil 80 can be a "spiral" coil or "pancake" coil in communication with the plasma processing region 45 from above as in a transformer coupled plasma (TCP) reactor.

Alternately, the plasma can be formed using electron cyclotron resonance (ECR). In yet another embodiment, the plasma is formed from the launching of a Helicon wave. In yet another embodiment, the plasma is formed from a propagating surface wave.

As discussed above, the process control system 100 includes a process tool controller 55, wherein the process tool controller 55 is configured to set the process control input data necessary to operate the process tool 10. For example, the set of process control input data can be selected to achieve a target set of process control output data. The process tool controller 55 is further capable of executing at least one algorithm to receive process control output data from the metrology tool 140, determine a relationship (process model 150) between the process control input data and the process control output data, update the process model from run-to-run, utilize the process model to optimize process control input data for target process control output data, and utilize the process model for process control.

The process model 150 establishes a relationship between the process control input data and process control output data and, therefore, the process model 150 enables the prediction of process control output data for a given observation of process control input data. The following describes the method of constructing the process model 150.

Figure 6:
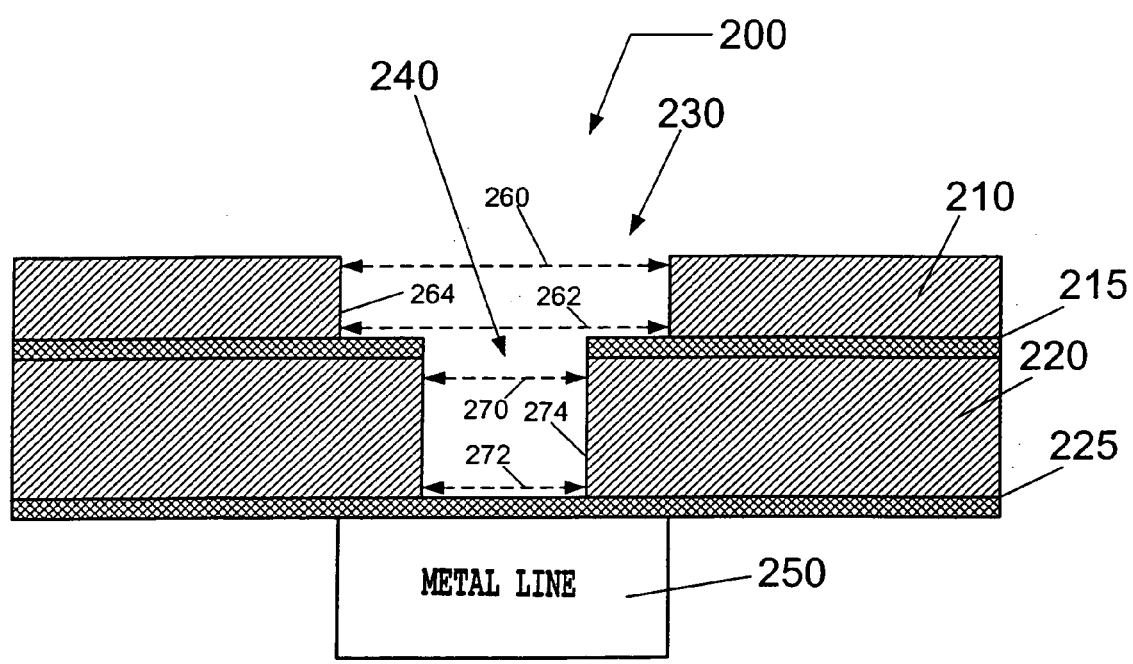
FIG. 6 illustrates a schematic view of an etch feature having a trench and a contact.

In an example, the semiconductor manufacturing system 1 can be a plasma processing device configured for dry plasma etching. More specifically, the plasma processing device can include an etch system, such as that depicted in FIG. 3, suitable for etching at least one of a trench, via, or contact in a dielectric film such as silicon dioxide. For example, FIG. 6 illustrates a simplified schematic of a device structure 200 formed using a damascene process having inter-metal dielectric layers 210 and 220, etch stop layer 215 and barrier layer 225 through which a trench 230 and a via/contact 240 have been formed using an etch process. The trench/via structure ultimately can provide electrical contact to metal line 250. Although the foregoing description is directed towards an etch process, it is not intended to limit the scope of the present invention in any manner.

For a dielectric etch process such as that illustrated in FIG. 6, the process control input data can, for example, include RF power, process pressure, $C_4F_8$ flow rate, $O_2$ flow rate, and CO flow rate. Furthermore, as depicted in FIG. 6, the process control output data can, for example, include the critical dimension at the top of a trench 260, the critical dimension at the bottom of a trench 262, the slope of the trench sidewall 264, the critical dimension at the top of the contact 270, the critical dimension at the bottom of the contact 272, and the slope of the sidewall of the contact 274.

The measurement of critical dimensions and slope can be performed directly using a scanning electron microscope (SEM) to view SEM micrographs from cleaved substrates, or indirectly using advanced, in-situ technology such as, for example, DUV spectroscopic ellipsometry (e.g., see "Specular spectroscopic scatterometry", *IEEE Transactions on Semiconductor Manufacturing*, Vol. 14, No. 2, May 2001, which is incorporated herein by reference in its entirety). A commercially available product featuring optical digital profilometry (ODP) is that sold and distributed by Timbre Technologies, Inc., A TEL Company (5341 Randall Place, Fremont, Calif. 94538) coupled with the hardware from Therma-Wave, Inc. (1250 Reliance Way, Fremont, Calif. 94539).

Each set of data, including both process control input data and process control output data, includes an observation set, where either a single observation can be made per substrate or a plurality of observations can be performed per substrate. Each observation in an observation set, including both process control input data and process control output data, can include an $n^{th}$ order statistic (e.g., time average, rms of time trace, skewness of time trace, cross-correlation, auto-correlation, variance, etc.). Additionally, an observation can include a square, or cross-product of parameter data.

For example, using the set of process control input data parameters described above, a design of experiments (DOE) can be performed. The DOE can include a Box-Behnken design having three (3) levels, five (5) factors (i.e., process control input data parameters), and six (6) centerpoints, which translates into forty six (46) observations (or substrate runs).

Given a plurality of observations sets, a relationship can be determined between the process control input data in the plurality of observation sets and the process control output data in the plurality of observation sets using multivariate analysis (MVA). One exemplary MVA technique for determining such a relationship is partial least squares (PLS) modeling.

Using PLS analysis, observation sets of process control input data are received from a plurality of sensors, or the current process recipe condition. For each observation set, process control input data can be stored as a row in a matrix $\overline{X}$ and process control output data can be stored as a row in matrix $\overline{Y}$. Hence, once the matrix $\overline{X}$ is assembled, each row represents a different observation and each column represents a different process control input data parameter, and, once the matrix $\overline{Y}$ is assembled, each row represents a different observation and each column represents a different process control output data parameter. Hence, using the set of parameters described above as an example, matrix $\overline{X}$ is a rectangular matrix of dimensions 46 by 5. Similarly, by way of example, matrix $\overline{Y}$ is a rectangular matrix of dimensions 46 by 6. More generally, matrix $\overline{X}$ can be an m by n matrix, and matrix $\overline{Y}$ can be an m by p matrix. Once all of the data is stored in the matrices, the data can be mean-centered and/or normalized, if desired. The process of mean-centering the data stored in a matrix column involves computing a mean value of the column elements and subtracting the mean value from each element. Moreover, the data residing in a column of the matrix can be normalized by the standard deviation of the data in the column.

In the PLS analysis, a set of loading (or correlation) coefficients can be defined which relate the process control input data ($\overline{X}$) to the process control output data ($\overline{Y}$). In general, for multivariate analysis, the relationship between the process control input data and the process control output data can be expressed as follows:

$$\overline{X}\overline{B} = \overline{Y}, \tag{1}$$

where $\overline{X}$ represents the m by n matrix described above, $\overline{B}$ represents an n by p (p<n) loading (or correlation) matrix and $\overline{Y}$ represents the m by p matrix described above.

Once the data matrices $\overline{X}$ and $\overline{Y}$ are assembled, a relationship designed to best approximate the $\overline{X}$ and $\overline{Y}$ spaces and to maximize the correlation between $\overline{X}$ and $\overline{Y}$ is established using PLS analysis.

In the PLS analysis model, the matrices $\overline{X}$ and $\overline{Y}$ are decomposed as follows:

$$\overline{X} = \overline{T}\overline{P}^T + \overline{E}; \tag{2a}$$

$$\overline{Y} = \overline{U}\overline{C}^T + \overline{F}; \tag{2b}$$

and $$\overline{U} = \overline{T} + \overline{H}; \tag{2c}$$

where $\overline{T}$ is a matrix of scores that summarizes the $\overline{X}$ variables, $\overline{P}$ is a matrix of loadings for matrix $\overline{X}$, $\overline{U}$ is a matrix of scores that summarizes the $\overline{Y}$ variables, $\overline{C}$ is a matrix of weights expressing the correlation between $\overline{Y}$ and $\overline{T}(\overline{X})$, and $\overline{E}$, $\overline{F}$ and $\overline{H}$ are matrices of residuals. Furthermore, in the PLS analysis model, there are additional loadings $\overline{W}$ called weights that correlate $\overline{U}$ and $\overline{X}$, and are used to calculate $\overline{T}$. In summary, the PLS analysis geometrically corresponds to fitting a line, plane or hyper plane to both the $\overline{X}$ and $\overline{Y}$ data represented as points in a multidimensional space, with the objective of well approximating the original data tables $\overline{X}$ and $\overline{Y}$, and maximizing the covariance between the observation positions on the hyper planes.

Figure 7:
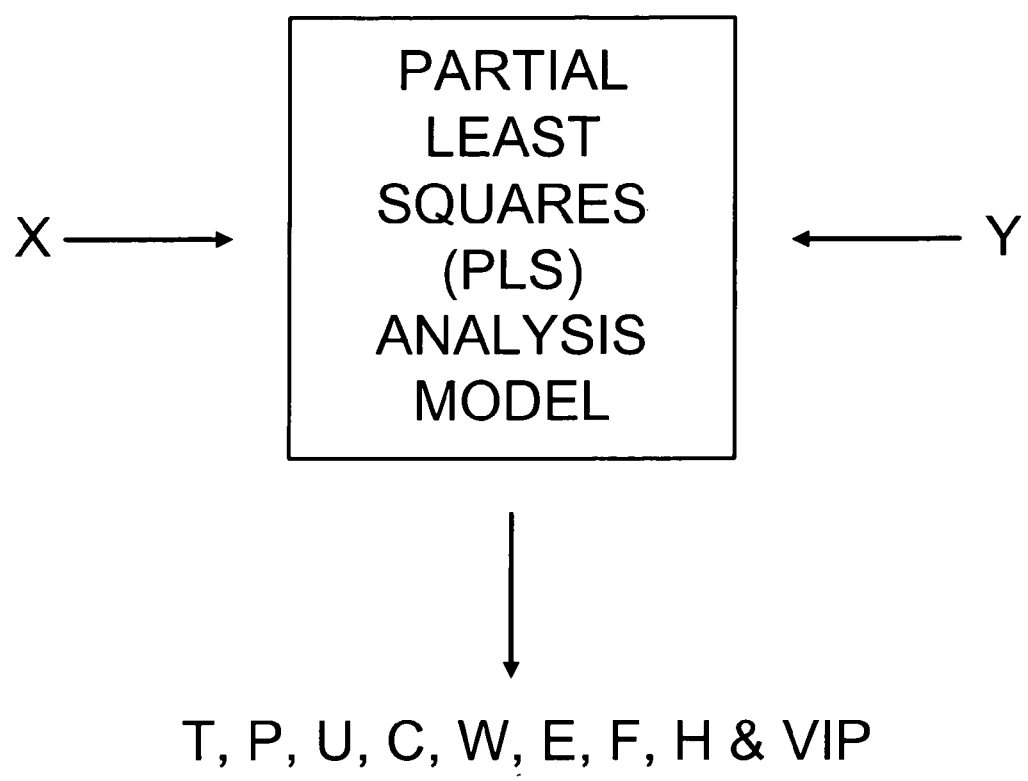
FIG. 7 illustrates a schematic flow diagram for using partial least squares (PLS) analysis.

FIG. 7 provides a schematic representation of the data inputs, $\overline{X}$ and $\overline{Y}$, to the PLS analysis and the corresponding outputs $\overline{T}$, $\overline{P}$, $\overline{U}$, $\overline{C}$, $\overline{W}$, $\overline{E}$, $\overline{F}$, $\overline{H}$ and variable importance in the projection (VIP). Examples of commercially available software which supports PLS analysis modeling are the PLS_Toolbox offered with MATLAB (commercially available from The Mathworks, Inc., Natick, Mass.), or SIMCA-P 8.0 (commercially available from Umetrics, Kinnelon, N.J.).

The variable importance in the projection (VIP) data can be utilized to identify those parameters of the input data set (i.e., process control input data) that contribute most to the correlation between $\overline{X}$ and $\overline{Y}$. For example, using the exemplary etch process described above, the five (5) process control input data parameters can be reduced to $C_4F_8$ flow rate, $O_2$ flow rate, and process pressure.

In general, such software outputs other important information regarding the descriptive power of the model (i.e., the quality of the correlation. obtained between $\overline{X}$ and $\overline{Y}$), and the predictive power of the model. For example, SIMCA-P iteratively computes one PLS component at a time, that is one vector each of X-scores $\overline{T}$, Y-scores $\overline{U}$, weights $\overline{W}$ and $\overline{C}$, and loadings $\overline{P}$. The PLS components are calculated in descending order of importance. After each PLS component, SIMCA-P can display the following: the fraction of the sum of squares (SS) of all Y's and X's explained by the current component ($R^2X$, $R^2Y$); the fraction of variance of all the Y's and X's explained by the current component ($R^2Xadj$, $R^2Yadj$); the cumulative SS of all the Y's and X's explained by all extracted components ($R^2X(cum)$, $R^2Y(cum)$); and the cumulative variance of all the Y's and X's explained by all extracted components ($R^2Xadj(cum)$, $R^2Yadj(cum)$).

Furthermore, for every active variable, the fraction of SS ($R^2V$) or variance ($R^2Vadj$) explained can be displayed. This value is computed for the current component as well as cumulatively for all PLS components. For response variables $\overline{Y}$, this value corresponds to $R^2$ (the multiple correlation coefficient), the "goodness" of the fit. For example, utilizing the data above, Table I presents this value for $\overline{Y}$ ($R^2VY(cum)$) for each process control output data parameter, namely, the critical dimension at the top of a trench 260, the critical dimension at the bottom of a trench 262, the slope of the trench sidewall 264, the critical dimension at the top of the contact 270, the critical dimension at the bottom of the contact 272, and the slope of the sidewall of the contact 274 (see FIG. 6).

TABLE 1

| Predicted process control output data | $R^2$ |
|---|---|
| CD_Trench bottom | 0.962 |
| CD_Trench top | 0.722 |
| Trench slope | 0.931 |
| CD_Contact bottom | 0.963 |
| CD_Contact top | 0.899 |
| Contact slope | 0.906 |

In general, additional criterion used to determine the model dimensionality (number of significant PLS components), is cross validation. With cross validation, observations are kept out of the model development, then the response values ($\overline{Y}$) for the kept out observations are predicted by the model, and compared with the actual values. This procedure is repeated several times until every observation has been kept out once and only once. The prediction error sum of squares (PRESS) is the squared differences between observed $\overline{Y}$ and predicted values when the observations were kept out. For every dimension, the overall PRESS/SS is computed, where SS is the residual sum of squares of the previous dimension, and also (PRESS/SS)$_m$ for each $\overline{Y}$ variable (m). These values are good measures of the predictive power of the model. For example, SIMCA-P can present this information as follows: the fraction of the total variation of the Y's that can be predicted by a component ($Q^2=(1.0-PRESS/SS)$); the fraction of the variation of a variable $Y_m$ that can be predicted by a component ($Q^2V=(1.0-PRESS/SS)_m$); the cumulative $Q^2$ for the extracted components ($Q^2_{cum}=\Pi(1.0-PRESS/SS)_a$); and the cumulative $Q^2V$ of a variable ($Q^2V_{cum}=\Pi(1.0-PRESS/SS)_{ka}$).

Figure 8:
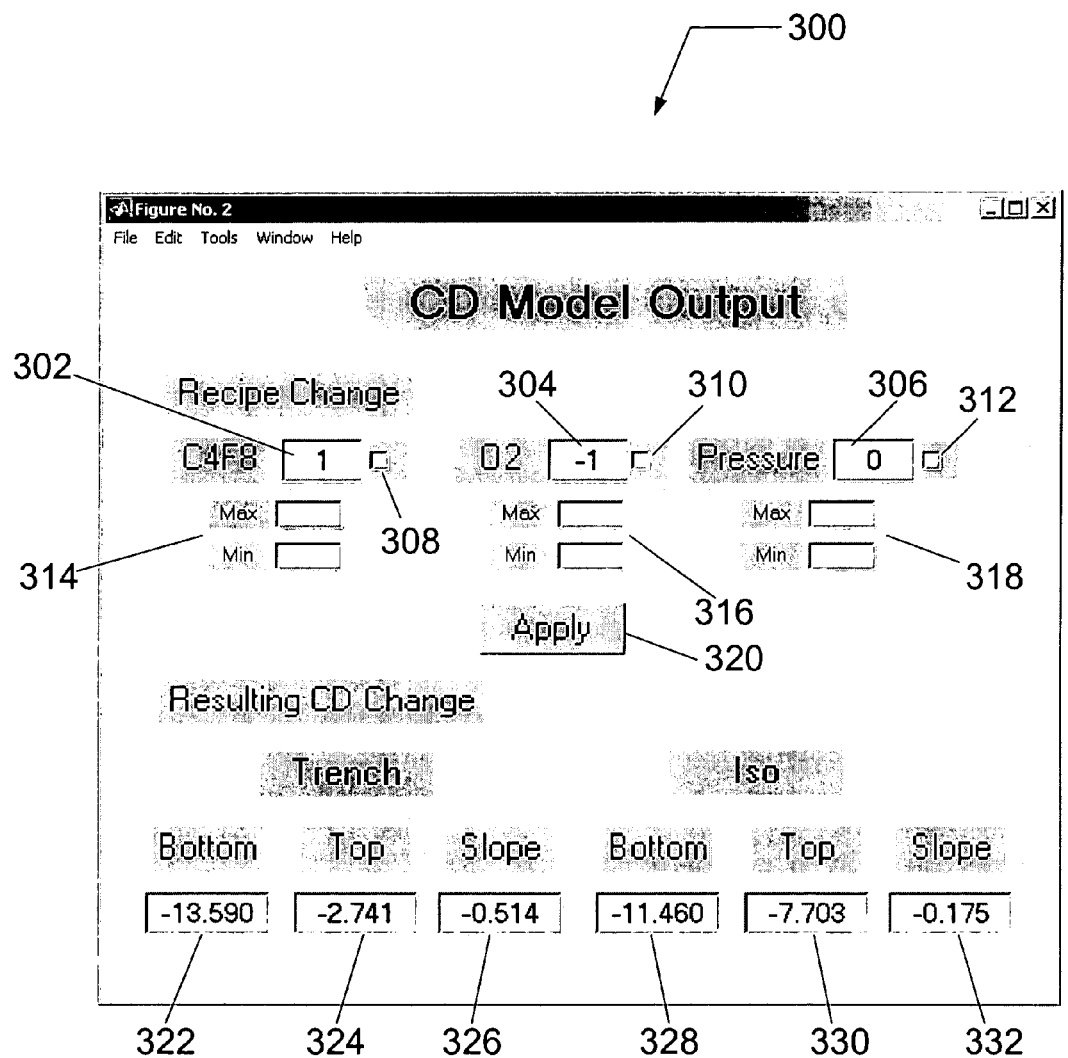
FIG. 8 presents a graphical user interface (GUI) for predicting process control output data according to an embodiment of the present invention.

Referring now to FIG. 8, a graphical user interface (GUI) for predicting process control output data using the process model developed with PLS analysis is presented. The GUI screen 300 includes one or more fields for designating a change in the process control input data. For example, a first delta field 302 for changing the $C_4F_8$ flow rate, a second delta field 304 for changing the $O_2$ flow rate, and a third delta field 306 for changing the process pressure are provided. A numerical value, such as plus (+1) or minus one (−1), can be entered to adjust the specific parameter; flow rates are given in units of standard cubic centimeters per minute (sccm), and pressure is given in units of mTorr.

Additionally, a first inclusion field 308, a second inclusion field 310, and a third inclusion field 312 can be utilized to identify those parameters to which change can be made. For instance, if an inclusion field is checked, a change to the specific parameter is not allowed. Furthermore, a first minimum and first maximum range 314 is provided for specifying a minimum value and a maximum value between which a change to the first parameter can be affected, a second minimum and a second maximum range 316 is provided for specifying a minimum value and a maximum value between which a change to the second parameter can be affected, and a third minimum and a third maximum range 318 is provided for specifying a minimum value and a maximum value between which a change to the third parameter can be affected. For example, the minimum and maximum range can be set to identify the parameter range with the highest confidence in prediction provided by the process model. Although only three process control input data parameters are addressed herein, more or less can be utilized and, hence, the present invention is not to be limited in scope in any manner by this example.

Referring still to FIG. 8, once a change to the process control input data is requested via apply function 320, the process model presents the resulting change to the process control output data in, for example, a first output field 322 for the critical dimension at the top of the trench, a second output field 324 for the critical dimension at the bottom of the trench, a third output field 326 for the slope of the trench sidewall, a fourth output field 328 for the critical dimension at the top of the contact, a fifth output field 330 for the critical dimension at the bottom of the contact, and a sixth output field 332 for the slope of the sidewall of the contact. Although only six process control output parameters are addressed herein, more or less can be utilized and, hence, the present invention is not to be limited in scope in any manner by this example.

Figure 9:
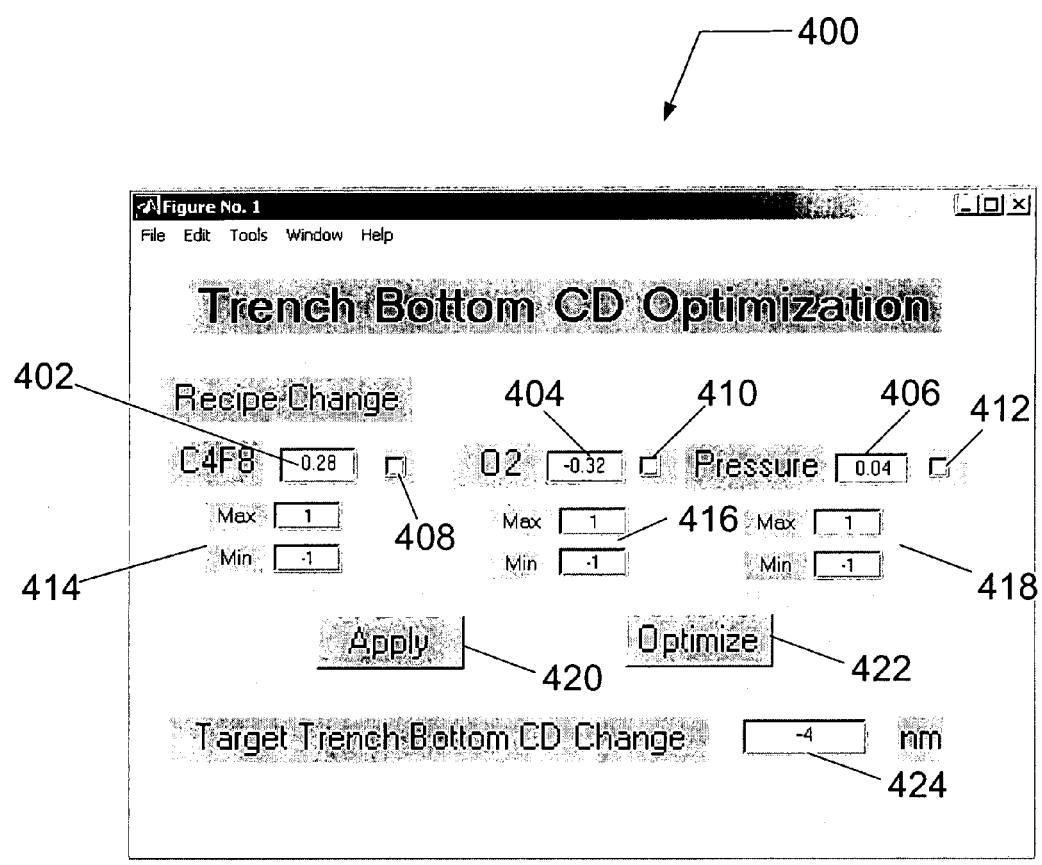
FIG. 9 presents a graphical user interface (GUI) for optimizing process control input data according to another embodiment of the present invention.

FIG. 9 presents another graphical user interface (GUI) for optimizing a set of process control input data to achieve a target change in a specific parameter in the process control output data. The GUI screen 400 includes one or more fields for displaying a predicted change in the process control input data. For example, a first delta field 402 for predicting a change to the $C_4F_8$ flow rate, a second delta field 404 for predicting a change to the $O_2$ flow rate, and a third delta field 406 for predicting a change to the process pressure are provided. A numerical value, such as plus (+1) or minus one (−1), can be displayed following the optimization of the process control input data to achieve a specified change to a process control output data parameter; flow rates are given in units of standard cubic centimeters per minute (sccm), and pressure is given in units of mTorr. Additionally, a first inclusion field 408, a second inclusion field 410, and a third inclusion field 412 can be utilized to identify those parameters to which a predicted change can be suggested. For instance, if an inclusion field is checked, a change to the specific parameter is not allowed for the optimization process. Furthermore, a first minimum and first maximum range 414 is provided for specifying a minimum value and a maximum value between which a change to the first parameter can be affected, a second minimum and a second maximum range 416 is provided for specifying a minimum value and a maximum value between which a change to the second parameter can be affected, and a third minimum and a third maximum range 418 is provided for specifying a minimum value and a maximum value between which a change to the third parameter can be affected. For example, the minimum and maximum range can be set to identify the parameter range with the highest confidence in prediction provided by the process model. Although only three process control input parameters are addressed herein, more or less can be utilized and, hence, the present invention is not to be limited in scope in any manner.

Referring still to FIG. 9, a target change 424 can be specified for a specific process control output data parameter. For the example provided, the process control output data parameter is the critical dimension at the trench bottom. Once the target change 424 is entered, the set of process control input data in fields 402, 404, and 406 can be optimized by using the optimization function 422. Thereafter, a change in the set of process control input data can be accepted by selecting the apply function 420.

Figure 10:
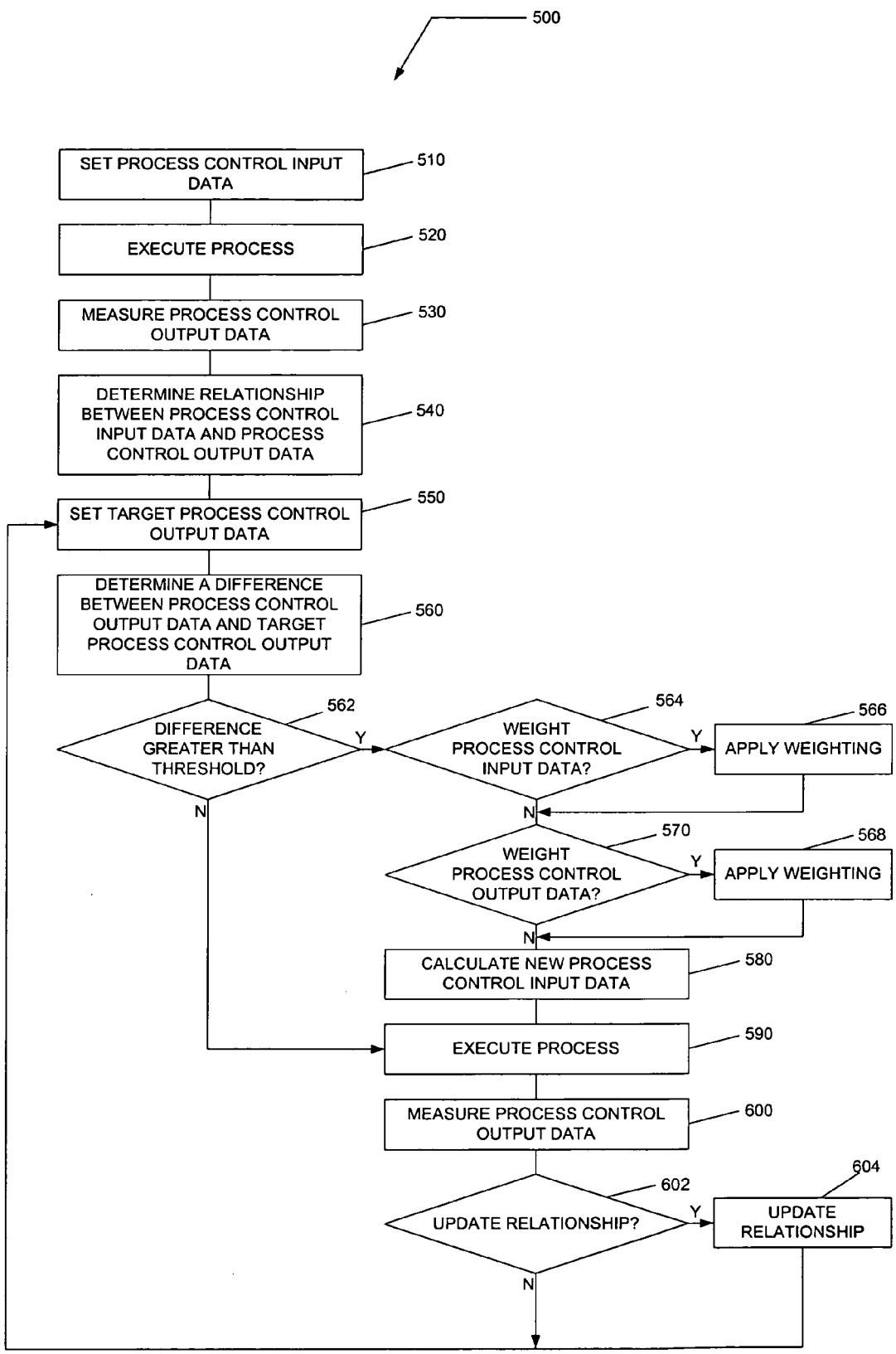
FIG. 10 presents a method of controlling a process in a semiconductor manufacturing system according to an embodiment of the present invention.

FIG. 10 presents a method of controlling a process in a semiconductor manufacturing system, such as one described in connection with FIGS. 1 through 5. The method is illustrated in flowchart 500, beginning in 510 with setting process control input data for the process to be performed in the semiconductor manufacturing system. The process control input data can utilize one or more data parameters used to set a process recipe for the process. For example, in an etch system, the one or more data parameters can include at least one of a RF power, a pressure, a temperature, a gas flow rate(s), a voltage, a current, a density, a light intensity, a substrate backside gas pressure, etc. In the example provided above, the process control input data includes RF power, pressure, $C_4F_8$ flow rate, $O_2$ flow rate, and CO flow rate. Additionally, for example, in a spin coating system such as one for coating a substrate with light-sensitive material, the process control input data can include at least one of a coating fluid dispensing rate, a coating fluid composition, a spin chuck rotation rate, a pressure, a temperature, a humidity, etc. The techniques for designing a set of process control input data for a specific process are well known to those skilled in the art of semiconductor manufacturing.

In 520, the process is executed using the process control input data as input to the process. The process can, for example, include an etch process, a deposition-process, a spin coating process, a diffusion process, an oxidation process, a thermal process, etc.

In 530, process control output data is measured for the process performed in the semiconductor manufacturing system. The process control output data can include one or more data parameters indicative of the performance of the process. For example, in an etch system, the one or more data parameters can include at least one of a critical dimension, a slope of a feature sidewall (e.g. etch feature sidewall profile), an etch depth, an etch rate, a uniformity, an etch selectivity (ratio of the rate at which a first material is etched to the rate at which a second material is etched), etc. Alternately, for example, in a deposition process, the one or more data parameters can include at least one of a deposition rate, a film property (e.g. film stress, porosity, etc.), a uniformity, a film thickness, etc. Alternately, for example, in a plasma process, the one or more data parameters can include at least one of a plasma density (obtained, for example, from a Langmuir probe), an ion energy (obtained, for example, from an ion energy spectrum analyzer), a concentration of a chemical specie (obtained, for example, from optical emission spectroscopy), a temperature, a pressure, etc. Alternatively, for example, in a spin coating system, the one or more data parameters can include at least one of a mask (e.g., photoresist) film thickness, a mask (e.g., photoresist) pattern critical dimension, etc.

In 540, a relationship (such as for example process model 150 in FIG. 1) is determined between the process control input data and the process control output data. The relationship can include a process model derived from multivariate analysis (MVA), such as partial least squares (PLS) analysis as described above. For example, when the process control input data includes multiple input data parameters and the process control output data includes multiple output data parameters, the process model can include a multiple input multiple output (MIMO) model, viz.

$$\underline{Y} = f(\underline{X}) + \underline{C} \tag{3}$$

where $\underline{Y}$ is a vector comprising the process control output data, $\underline{X}$ is a vector comprising the process control input data as well as, for example, its square terms and cross terms, and $\underline{C}$ is a vector including constants that can, for example, be updated from run-to-run (e.g., substrate-to-substrate, observation-to-observation, etc.). Alternately, for example, when the process control input data includes only a single input data parameter and the process control output data includes only a single output data parameter, the process model can include a single input single output (SISO) model, viz.

$$y = f(x) + c = b_2 x^2 + b_1 x + c. \tag{4}$$

where y, x are single-valued variables, and c is a constant.

In 550, target process control output data $y_T$, $\underline{Y}_T$ is/are set by an operator, or a user to a desired target result of the process. The target data can be set either locally at the process tool, or remotely.

In 560, once the target process control output data are set for the process, a difference between the target process control output data and the process control output data measured for the process is determined. If in 562 the difference exceeds a threshold, then new process control input data are calculated in 580. If in 562 the difference does not exceed the threshold, then the old process control input data are used. The option to include this comparison provides the method of controlling the process with the ability to avoid too sensitive control, i.e., changes are made to the process control input data when the current process control output data are within an acceptable distance from the target data.

In 580, the new process control input data are calculated by minimizing the difference between the target process control output data set in 550 and process control output data predicted by the process model in 540 using the new process control input data applied to the process model. For example, using a SISO process model, the minimization problem can be expressed as $$x_{k+1} = \min_{x_{k+1}} \| y_T - (b_2 x_{k+1}^2 + b_1 x_{k+1} + c_{k+1}) \|^2, \tag{5a}$$

or, more generally for a MIMO process model, $$\underline{X}_{k+1} = \min_{x_{k+1}} \| \underline{Y}_T - (f(\underline{X}_{k+1}) + \underline{C}_{k+1}) \|^2, \tag{5b}$$

where 'k+1' represents the new data for a new process. The algorithm utilized can, for example, include a Newton-Rhapson solver. Since the minimization problem is an optimization problem, three situations can be encountered when attempting to solve the optimization problem, namely, an exact solution, an under-determined problem, and an over-determined problem. In cases where multiple solutions exist, another criterion is that the change between the old value(s) for the process control input data and the new process control input data should be minimized, viz.

$$x_{k+1} = \min_{x_{k+1}} \| x_{k+1} - x_k \|^2, \tag{6a}$$

or, more generally, $$\underline{X}_{k+1} = \min_{x_{k+1}} \| \underline{X}_{k+1} - \underline{X}_k \|^2. \tag{6b}$$

In 564, an option to weight the process control input data during the calculation of new process control input data using, for instance, a MIMO process model is provided. If the option is selected, at least one data parameter within the set of process control input data is weighted in 566. For example, one data parameter can be given a greater weighting relative to another data parameter and, therefore, the change in the process control input data necessary to achieve a target process control output data favors the more heavily weighted data parameter. The minimization problem solved in 580, now becomes (for a MIMO process model)

$$\underline{X}_{k+1} = \min_{\underline{X}_{k+1}} \|\underline{V}\underline{X}_{k+1} - \underline{V}\underline{X}_k\|^2. \tag{7}$$

In 568, an option to weight the process control output data during the calculation of new process control input data using a MIMO process model is provided. If the option is selected, at least one data parameter within the set of process control output data is weighted in 570. For example, one data parameter can be given a greater weighting relative to another data parameter and, therefore, the change in the process control input data necessary favors the more heavily weighted data parameter. The minimization problem solved in 580, now becomes (for a MIMO process model)

$$\underline{X}_{k+1} = \min_{\underline{X}_{k+1}} \|\underline{W}(\underline{Y}_T - (f(\underline{X}_{k+1}) + \underline{C}_{k+1}))\|^2, \tag{8}$$

where $\underline{W}$ is a process control output data weighting matrix.

In 590, a process is executed in the semiconductor manufacturing system using either the current process control input data, or the new process control input data determined in 580.

In 600, process control output data are measured for the process executed in 590.

In 602, a determination is made to update the relationship (or process model) established in 540. If an update to the process model is requested, then the process model is updated in 604. For example, an exponentially weighted moving average (EWMA) filter can be employed for performing the update, viz.

$$c_{k+1} = \lambda(y_k - b_2 x_k^2 - b_1 x_k) + (1-\lambda)c_k, \tag{9a}$$

or, more generally for a MIMO process model, $$\underline{C}_{k+1} = \lambda(\underline{Y}_k - f(\underline{X}_k)) + (1-\lambda)\underline{C}_k, \tag{9b}$$

where $\lambda$ represents an EWMA filter coefficient ($0 \leq \lambda \leq 1$). For example, when $\lambda=0$, the process model is not updated, and the constant c remains unchanged from process 'k' to process 'k+1'. When $\lambda=1$, the process model is updated, and the constant c assumes none of the old constant $c_k$ from process 'k' to process 'k+1'.

Figure 11:
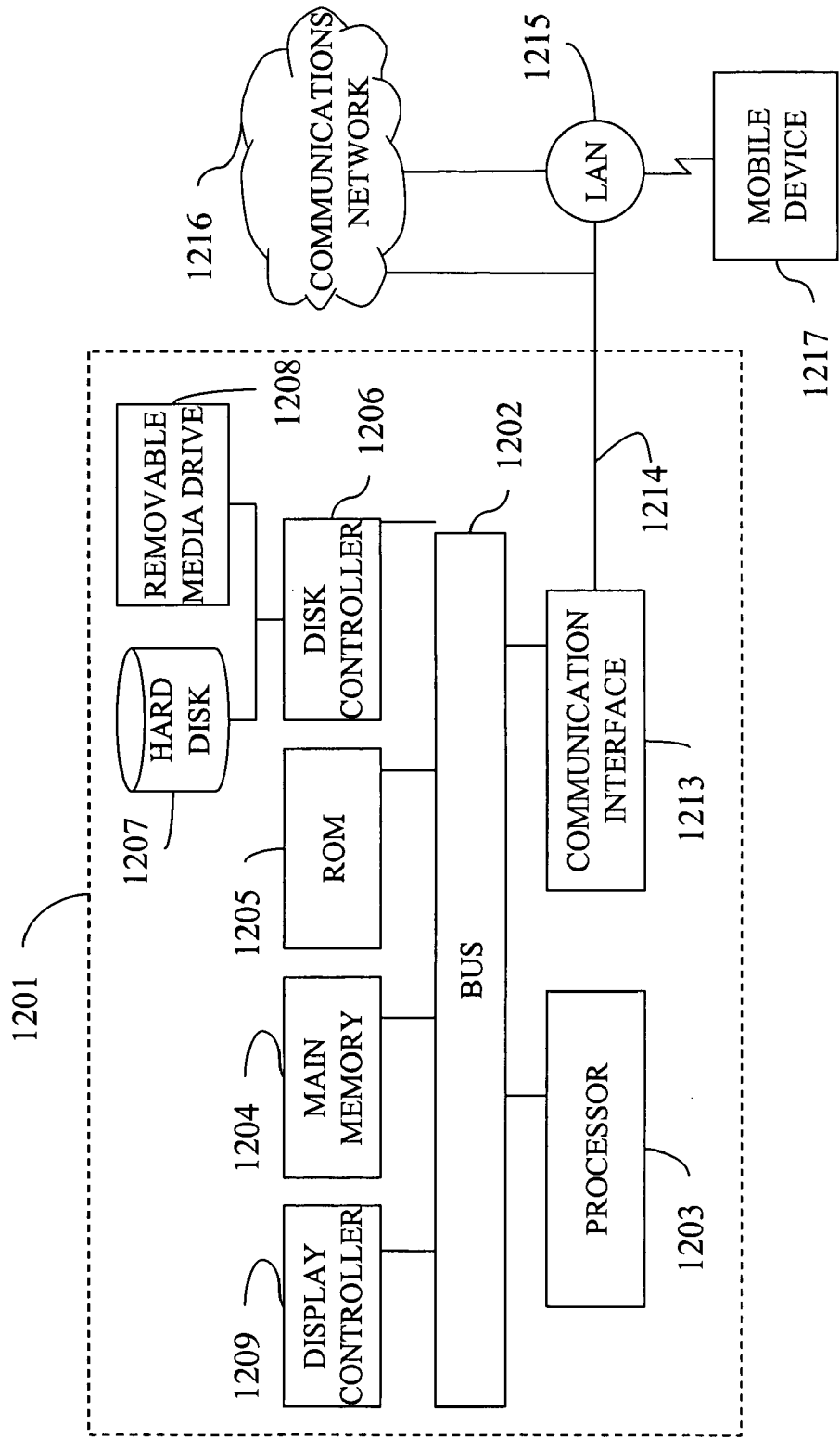
FIG. 11 illustrates one embodiment of a computer system upon which a processor in the process tool controller of the present invention may be implemented.

FIG. 11 illustrates one embodiment of a computer system 1201 in which the process tool controller 110 of the present invention can be implemented. The computer system 1201 is programmed and/or configured to perform any or all of the functions of the process tool controller 110 including the method described in flowchart 500 described above. The computer system 1201 includes a bus 1202 or other communication mechanism for communicating information, and a internal processor 1203 coupled with the bus 1202 for processing the information. The computer system 1201 includes a memory 1204, such as a random access memory (RAM) or other dynamic storage device (e.g., dynamic RAM (DRAM), static RAM (SRAM), and synchronous DRAM (SDRAM)), coupled to the bus 1202 for storing information and instructions to be executed by the internal processor 1203. In addition, the memory 1204 may be used for storing temporary variables or other intermediate information during the execution of instructions by the internal processor 1203. The computer system 1201 preferably includes a non-volatile memory such as for example a read only memory (ROM) 1205 or other static storage device (e.g., programmable ROM (PROM), erasable PROM (EPROM), and electrically erasable PROM (EEPROM)) coupled to the bus 1202 for storing static information and instructions for the internal processor 1203.

The computer system 1201 may include special purpose logic devices (e.g., application specific integrated circuits (ASICs)) or configurable logic devices (e.g., simple programmable logic devices (SPLDs), complex programmable logic devices (CPLDs), and field programmable gate arrays (FPGAs)).

The computer system 1201 performs a portion or all of the processing steps of the invention in response to the internal processor 1203 executing one or more sequences of one or more instructions contained in a memory, such as the main memory 1204. Such instructions may be read into the main memory 1204 from another computer readable medium, such as a hard disk 1207 or a removable media drive 1208. Such capability being compatible mostly with the embodiment in which the electronic monitoring device is outside the semiconductor processing system 12. One or more processors in a multi-processing arrangement may also be employed to execute the sequences of instructions contained in main memory 1204. In alternative embodiments, hard-wired circuitry may be used in place of or in combination with software instructions. Thus, embodiments are not limited to any specific combination of hardware circuitry and software.

As stated above, the computer system 1201 includes at least one computer readable medium or memory for holding instructions programmed according to the teachings of the invention and for containing data structures, tables, records, or other data described herein. Examples of computer readable media suitable for the present invention are compact discs, hard disks, floppy disks, tape, magneto-optical disks, PROMs (EPROM, EEPROM, flash EPROM), DRAM, SRAM, SDRAM, or any other magnetic medium, compact discs (e.g., CD-ROM), or any other optical medium, punch cards, paper tape, or other physical medium with patterns of holes, a carrier wave (described below), or any other medium from which a computer can read.

Stored on any one or on a combination of computer readable media, the present invention includes software for controlling the computer system 1201, for driving a device or devices for implementing the invention, and for enabling the computer system 1201 to interact with a human user (e.g., to interact with consumable part disposal personnel). Such software may include, but is not limited to, device drivers, operating systems, development tools, and applications software. Such computer readable media further includes the computer program product of the present invention for performing all or a portion (if processing is distributed) of the processing performed in implementing the invention.

The computer code devices of the present invention may be any interpretable or executable code mechanism, including but not limited to scripts, interpretable programs, dynamic link libraries (DLLs), Java classes, and complete executable programs. Moreover, parts of the processing of the present invention may be distributed for better performance, reliability, and/or cost.

The term "computer readable medium" as used herein refers to any medium that participates in providing instructions to the internal processor 1203 for execution. A computer readable medium may take many forms, including but not limited to, non-volatile media, volatile media, and transmission media. Non-volatile media includes, for example, optical, magnetic disks, and magneto-optical disks, such as the hard disk 1207 or the removable media drive 1208. Volatile media includes dynamic memory, such as the main memory 1204. Transmission media includes coaxial cables, copper wire and fiber optics, including the wires that make up the bus 1202. Transmission media also may also take the form of acoustic or light waves, such as those generated during radio wave and infrared data communications.

Various forms of computer readable media may be involved in carrying out one or more sequences of one or more instructions to internal processor 1203 for execution. For example, the instructions may initially be carried on a magnetic disk of a remote computer. The remote computer such as for example the tool controller 26 can load the instructions for implementing all or a portion of the present invention remotely into a dynamic memory and send the instructions to the electronic monitoring device 10. An infrared detector coupled to the bus 1202 can receive the data carried in the infrared signal and place the data on the bus 1202. The bus 1202 carries the data to the main memory 1204, from which the internal processor 1203 retrieves and executes the instructions. The instructions received by the main memory 1204 may optionally be stored on storage device 1207 or 1208 either before or after execution by the internal processor 1203.

The computer system 1201 also includes a communication interface 1213 coupled to the bus 1202. The communication interface 1213 provides a two-way data communication coupling to a network link 1214 that is connected to, for example, a local area network (LAN) 1215, or to another communications network 1216 such as the Internet. For example, the communication interface 1213 may be a network interface card to attach to any packet switched LAN. As another example, the communication interface 1213 may be an asymmetrical digital subscriber line (ADSL) card, an integrated services digital network (ISDN) card or a modem to provide a data communication connection to a corresponding type of communications line. Wireless links may also be implemented. In any such implementation, the communication interface 1213 sends and receives electrical, electromagnetic or optical signals that carry digital data streams representing various types of information.

The network link 1214 typically provides data communication through one or more networks to other data devices. For example, the network link 1214 may provide a connection to another computer through a local network 1215 (e.g., a LAN) or through equipment operated by a service provider, which provides communication services through a communications network 1216. The local network 1214 and the communications network 1216 use, for example, electrical, electromagnetic, or optical signals that carry digital data streams, and the associated physical layer (e.g., CAT 5 cable, coaxial cable, optical fiber, etc). The signals through the various networks and the signals on the network link 1214 and through the communication interface 1213, which carry the digital data to and from the computer system 1201 maybe implemented in baseband signals, or carrier wave based signals. The baseband signals convey the digital data as unmodulated electrical pulses that are descriptive of a stream of digital data bits, where the term "bits" is to be construed broadly to mean symbol, where each symbol conveys at least one or more information bits. The digital data may also be used to modulate a carrier wave, such as with amplitude, phase and/or frequency shift keyed signals that are propagated over a conductive media, or transmitted as electromagnetic waves through a propagation medium. Thus, the digital data may be sent as unmodulated baseband data through a "wired" communication channel and/or sent within a predetermined frequency band, different than baseband, by modulating a carrier wave. The computer system 1201 can transmit and receive data, including program code, through the network(s) 1215 and 1216, the network link 1214, and the communication interface 1213. Moreover, the network link 1214 may provide a connection through a LAN 1215 to a mobile device 1217 such as a personal digital assistant (PDA) laptop computer, or cellular telephone.

Although only certain exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention.

The invention claimed is:

1. A method of controlling a process in a semiconductor manufacturing system, comprising:

setting process control input data for said process in said semiconductor manufacturing system;

measuring process control output data from said process in said semiconductor manufacturing system;

determining a functional relationship between said process control output data and said process control input data along a plurality of process control output data points;

setting target process control output data to a target result of the process; and calculating new process control input data based on the target result by, producing predicted process control output data associated with the plurality of process control output data points by applying the functional relationship to the new process control input data, and revising the new process control input data by minimizing an integrated difference between said target process control output data and the predicted process control output data to thereby improve control of the process.

2. The method as recited in claim 1, further comprising: updating said relationship between said process control input data and said new process control output data.

3. The method as recited in claim 2, wherein said updating said relationship comprises:

using an exponentially weighted moving average (EMWA) filter.

4. The method as recited in claim 1, wherein said calculating comprises:

weighing said process control input data prior to calculating said new process control input data.

5. The method as recited in claim 1, wherein said calculating comprises:

weighing said process control output data prior to calculating said new process control input data.

6. The method as recited in claim 1, further comprising: minimizing a difference between said process control input data and said new process control input data.

7. The method as recited in claim 1, wherein said determining comprises:
  developing said relationship with a process model developed using partial least squares (PLS) analysis.

8. The method as recited in claim 1, determining comprises:
  developing said wherein said relationship with a multiple input multiple output (MIMO) process model.

9. The method as recited in claim 8, wherein said developing further comprises:
  developing an MIMO process model characterized by $\underline{Y}=f(\underline{X})+\underline{C}$, wherein $\underline{Y}$ comprises process control output data, $\underline{X}$ comprises process control input data, $\underline{C}$ comprises an array of constants, and $f(\ )$ represents a function of $\underline{X}$.

10. The method as recited in claim 9, wherein said function $f(\ )$ represents a linear function.

11. The method as recited in claim 9, wherein said function $f(\ )$ represents a nonlinear function.

12. The method as recited in claim 1, wherein said setting comprises:
  setting said process input data for an etch process.

13. The method as recited in claim 1, wherein said setting comprises:
  setting said process control input data for least one of a RF power, a pressure, a fluid flow rate, a temperature, a rotation rate, and a composition.

14. The method as recited in claim 13, wherein said setting said process control input data comprises:
  setting said process control input data including at least one of a RF power, a pressure, a $C_4F_8$ flow rate, a CO flow rate, and a $O_2$ flow rate.

15. The method as recited in claim 1, wherein said measuring process control output data comprises:
  measuring said process control output data including at least one of a critical dimension, a slope, a profile, an etch rate, an etch depth, a deposition rate, and a film thickness.

16. The method as recited in claim 15, wherein said measuring process control output data comprises:
  measuring at least one of a critical dimension at the top of a trench, a critical dimension at the bottom of the trench, a slope of the sidewall of the trench, a critical dimension at the top of a contact, a critical dimension at the bottom of the contact, and the slope of the sidewall of the contact.

17. The method as recited in claim 1, wherein said calculating comprises:
  minimizing said difference using a Newton-Rhapson technique.

18. A control system for controlling a process in a semiconductor manufacturing system, comprising:
  a process tool controller configured to be coupled to a process tool for executing said process,
  said process tool controller further comprises,
  a process recipe controller configured to set and adjust process control input data for said process, and set target process control output data to a target result of the process, and
  a process model coupled to said process recipe controller and configured to provide a functional relationship between said process control input data and said process control output data along a plurality of process control output data points,
  wherein said process recipe controller is configured to generate new process control input data based on the target result; to produce predicted process control output data associated with the plurality of process control output data points by applying the functional relationship to the new process control input data; and to revise the new process control input data by minimizing an integrated difference between said target process control output data and the predicted process control output data to thereby improve control of the process.

19. The system as recited in claim 18, further comprising:
  a metrology tool coupled to said process tool controller and configured to be coupled to said process tool,
  said metrology tool is configured to measure process control output data for said process and provide said measured process control output data to said process tool controller for updating said process model.

20. The system as recited in claim 19, wherein said process tool controller is configured to update said process model using an exponentially weighted moving average (EWMA) filter.

21. The system as recited in claim 18, wherein said process model comprises partial least squares (PLS) analysis.

22. The system as recited in claim 18, wherein said process model comprises a multiple input multiple output (MIMO) process model.

23. The system as recited in claim 22, wherein said MIMO process model is characterized by $\underline{Y}=f(\underline{X})+\underline{C}$, wherein $\underline{Y}$ comprises process control output data, $\underline{X}$ comprises process control input data, $\underline{C}$ comprises an array of constants, and $f(\ )$ represents a function of $\underline{X}$.

24. The system as recited in claim 23, wherein said function $f(\ )$ represents a linear function.

25. The system as recited in claim 23, wherein said function $f(\ )$ represents a nonlinear function.

26. The system as recited in claim 18, wherein said process comprises an etch process.

27. The system as recited in claim 18, wherein said process control input data comprise at least one of a RF power, a pressure, a fluid flow rate, a temperature, a rotation rate, an a composition.

28. The system as recited in claim 27, wherein said process control input data comprises at least one of a RF power, a pressure, a $C_4F8$ flow rate, a CO flow rate, and a $O_2$ flow rate.

29. The system as recited in claim 18, wherein said process control output data comprise at least one of a critical dimension, a slope, a profile, an etch rate, an etch depth, a deposition rate, and a film thickness.

30. The system as recited in claim 29, wherein said process control output data comprises at least one of a critical dimension at the top of a trench, a critical dimension at the bottom of the trench, a slope of the sidewall of the trench, a critical dimension at the top of a contact, a critical dimension at the bottom of the contact, and the slope of the sidewall of the contact.

31. The system as recited in claim 18, wherein said process tool controller is configured to minimize said difference using a Newton-Rhapson technique.

32. A semiconductor manufacturing system for performing a process comprising:
  a process tool for executing said process; and
  a process tool controller coupled to said process tool, wherein said process tool controller further comprises,
  a process recipe controller configured to set and adjust process control input data for said process, and set target process control output data to a target result of the process, and a process model coupled to said process recipe controller and configured to provide a functional relationship between said process control input data and said process control output data along a plurality of process control output data points, said process recipe controller is configured to generate new process control input data based on the target result, to produce predicted process control output data associated with the plurality of process control output data points by applying the functional relationship to the new process control input data; and to revise the new process control input data by minimizing an integrated difference between said target process control output data and the predicted process control output data to thereby improve control of the process.

33. The system as recited in claim 32, further comprising:
a metrology tool coupled to said process tool controller and coupled to said process tool,
wherein said metrology tool is configured to measure process control output data for said process and provide said measured process control output data to said process tool controller for updating said process model.

34. The system as recited in claim 32, wherein said process tool comprises at least one of an etch process tool, a deposition process tool, a spin coating process tool, and a thermal processing system tool.

35. A computer readable medium containing program instructions for execution on a computer system controlling a semiconductor manufacturing system, which when executed by the computer system, cause the computer system to perform the steps of:
setting process control input data for said process in said semiconductor manufacturing system;
measuring process control output data from said process in said semiconductor manufacturing system;
determining a functional relationship between said process control output data and said process control input data along a plurality of process control output data points;
setting target process control output data to a target result of the process; and
calculating new process control input data based on the target result by,
producing predicted process control output data associated with the plurality of process control output data points by applying the functional relationship to the new process control input data, and
revising the new process control input data by minimizing an integrated difference between said target process control output data and the predicted process control output data to thereby improve control of the process.

36. The medium of claim 35, further containing said program instructions to perform the step of:
updating said relationship between said process control input data and said process control output data.

37. The medium of claim 36, further containing said program instructions to perform the step of:
using an exponentially weighted moving average (EMWA) filter.

38. The medium of claim 35, wherein said calculating in the program instructions comprises:
weighing said process control input data prior to calculating said new process control input data.

39. The medium of claim 35, wherein said calculating in the program instructions comprises:
weighing said process control output data prior to calculating said new process control input data.

40. The medium of claim 35, further containing said program instructions to perform the step of:
minimizing a difference between said process control input data and said new process control input data.

41. The medium of claim 35, wherein said determining in the program instructions comprises:
developing said relationship with a process model developed using partial least squares (PLS) analysis.

42. The medium of claim 35, further containing said program instructions to perform the step of:
developing said wherein said relationship with a multiple input multiple output (MIMO) process model.

43. The medium of claim 42, wherein said developing in the program instructions comprises:
developing an MIMO process model characterized by $\underline{Y}=f(\underline{X})+\underline{C}$, wherein $\underline{Y}$ comprises process control output data, $\underline{X}$ comprises process control input data, $\underline{C}$ comprises an array of constants, and $f(\ )$ represents a function of $\underline{X}$.

44. The medium of claim 43, wherein said function $f(\ )$ represents a linear function.

45. The medium of claim 43, wherein said function $f(\ )$ represents a nonlinear function.

46. The medium of claim 35, further containing said program instructions to perform the step of:
setting said process input data for an etch process.

47. The medium of claim 35, wherein said setting in the program instructions comprises:
setting said process control input data for least one of a RF power, a pressure, a fluid flow rate, a temperature, a rotation rate, and a composition.

48. The medium of claim 47, wherein said setting in the program instructions comprises:
setting said process control input data including at least one of a RF power, a pressure, a $C_4F_8$ flow rate, a CO flow rate, and a $O_2$ flow rate.

49. The medium of claim 35, wherein said measuring process control output data in the program instructions comprises:
measuring said process control output data including at least one of a critical dimension, a slope, a profile, an etch rate, an etch depth, a deposition rate, and a film thickness.

50. The medium of claim 47, wherein said measuring process control output data in the program instructions comprises:
measuring at least one of a critical dimension at the top of a trench, a critical dimension at the bottom of the trench, a slope of the sidewall of the trench, a critical dimension at the top of a contact, a critical dimension at the bottom of the contact, and the slope of the sidewall of the contact.

51. The medium of claim 35, wherein said calculating in the program instructions comprises:
minimizing said difference using a Newton-Rhapson technique.

* * * * *